US011330160B2

(12) United States Patent
Roux et al.

(10) Patent No.: US 11,330,160 B2
(45) Date of Patent: May 10, 2022

(54) DEVICE AND METHOD FOR OBSERVING A SCENE COMPRISING A TARGET

(71) Applicant: SAFRAN ELECTRONICS & DEFENSE, Paris (FR)

(72) Inventors: Nicolas Roux, Paris (FR); Brice Lerat, Paris (FR); Heloise Berthier, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/295,698

(22) PCT Filed: Nov. 20, 2019

(86) PCT No.: PCT/EP2019/081893
§ 371 (c)(1),
(2) Date: May 20, 2021

(87) PCT Pub. No.: WO2020/104509
PCT Pub. Date: May 28, 2020

(65) Prior Publication Data
US 2021/0360133 A1 Nov. 18, 2021

(30) Foreign Application Priority Data

Nov. 20, 2018 (FR) .................................... 18 71619

(51) Int. Cl.
*H04N 5/225* (2006.01)
*H04N 5/235* (2006.01)
*H04N 5/33* (2006.01)

(52) U.S. Cl.
CPC ......... *H04N 5/2258* (2013.01); *H04N 5/2254* (2013.01); *H04N 5/2351* (2013.01); *H04N 5/332* (2013.01)

(58) Field of Classification Search
CPC .. H04N 5/2258; H04N 5/2254; H04N 5/2351; H04N 5/332
See application file for complete search history.

(56) References Cited

U.S. PATENT DOCUMENTS

2009/0050806 A1* 2/2009 Schmidt ............. H04N 5/23212
250/332
2014/0321753 A1* 10/2014 Roux ................... G06K 9/0063
382/191

(Continued)

FOREIGN PATENT DOCUMENTS

EP 1978740 A1 10/2008
WO WO-2017/012899 A1 1/2017

*Primary Examiner* — Luong T Nguyen
(74) *Attorney, Agent, or Firm* — Muncy, Geissler, Olds & Lowe, PC

(57) ABSTRACT

An observation and designation apparatus includes a first image sensor and a second image sensor that are connected to an electronic image processor circuit connected to a display. The first image sensor and the second image sensor provide fields that are superposed to supply respectively at least a first image and a second image of the same scene. The appliance further includes a laser emitter for emitting a laser beam lying in a predetermined range of wavelengths into a predetermined zone of the field of the second sensor; a region-of-interest filter extending in front of the second sensor. The electronic processor circuit superposes the two images by using the zone of the second image that corresponds to the third region of the filter to register the second image spatially relative to the first image. An observation and designation method makes use of such filtering.

11 Claims, 1 Drawing Sheet

(56) References Cited

U.S. PATENT DOCUMENTS

2018/0091746 A1    3/2018  Benser et al.
2018/0211409 A1*  7/2018  Roux .................. G06T 7/73

* cited by examiner

DEVICE AND METHOD FOR OBSERVING A SCENE COMPRISING A TARGET

The present invention relates to the field of imaging and of capturing images. More particularly, the invention relates to apparatus and to a method for observing a scene that includes a target reflecting a laser beam, and for viewing in the images of the scene the spot that is formed by the laser beam on the target.

TECHNOLOGICAL BACKGROUND

Nowadays, most observation apparatuses contain an image capture device comprising an optical and electronic, or "optronic", sensor having a field that determines an observed scene. The optronic sensor, which is usually of complementary metal oxide semiconductor (CMOS) or charge-coupled device (CCD) type, includes sensing elements that are arranged continuously so as to form a matrix and that are arranged to collect light reflected or emitted by a portion of the scene present in the field of each sensing element (the sensing elements are more commonly referred to as "pixels", which is an abbreviation of the term "picture elements"). The photons of the light flux received by each sensing element causes electric charge to be created in the sensing element, which charge accumulates in the sensing element over a so-called "integration" time, prior to being collected in the form of an electrical signal representative of the light flux. Like the exposure time in conventional photography, the integration time, which is the same for all of the sensing elements, depends on the brightness of the scene: the lower brightness of the scene, the longer the integration time that is selected.

In certain applications, it is necessary to be able to view a scene and a light spot that results from a laser beam being reflected on a target that is to be found in the scene. In a scene that is very bright, such as a sunny scene, all of the details of the scene appear, and it is difficult to distinguish the laser spot among them. In a scene that is not very bright, such as under a cloudy sky, at dawn or dusk, or at night, it becomes difficult to obtain an image showing clearly the both light spot and also the details of the scene without having recourse to additional amplification devices such as a photodiode. Nevertheless, under certain conditions, such devices have the drawback of creating artefacts, such as blooming, or indeed of damaging the sensor by subjecting it to excess light flux.

Proposals have been made to have recourse to observation apparatus comprising a first image capture device for reproducing the scene on a first display, a laser emitter emitting a laser beam towards a target that is to be found in the scene and for forming a light spot on the target, and a second image capture device for reproducing the spot on a second display, the first capture device and the second capture device having fields that can be superposed one on the other. The integration time for the first image capture device is selected to show up the details of the scene, and the integration time for the second image capture device is selected to obtain a spot of reasonable diameter. The images produced by the first image capture device are displayed on the first display and the images produced by the second image capture device are displayed on the second display. Nevertheless, displaying in this way on two displays is not very practical.

OBJECT OF THE INVENTION

An object of the invention is to enable both the spot and also details of the scene to be displayed in a single image and to do so over a relatively broad range of brightnesses.

BRIEF SUMMARY OF THE INVENTION

For this purpose, the invention provides observation and designation apparatus comprising a first image sensor and a second image sensor that are connected to an electronic image processor circuit connected to a display, the first image sensor and the second image sensor being arranged to provide fields that are superposed in order to supply respectively at least a first image and a second image of the same scene, and the appliance further comprising a laser emitter for emitting a laser beam lying in a predetermined range of wavelengths into a predetermined zone of the field of the second sensor. A region-of-interest filter extends in front of the second sensor, the region-of-interest filter having a first region corresponding to the predetermined zone of the field, a second region surrounding the first region, and a third region surrounding the second region, the filter being arranged, in the second region to block substantially all of the light flux coming from the scene, in the first region to attenuate the light flux lying outside the predetermined range of wavelengths, and in the third region to transmit a maximum amount of the light flux. The electronic processor circuit is arranged to superpose the two images by using the zone of the second image that corresponds to the third region of the filter in order to register the second image spatially relative to the first image.

The first region performs spectral filtering to attenuate, or even eliminate, the contribution of daytime solar flux to the illumination of the sensor looking at this region: the contribution of the laser beam then becomes the majority contribution in the zone of the second sensor that is looking at the first region, thereby enabling the light spot formed by the laser beam on the target to be viewed clearly. The third region allows a maximum amount of light flux to be collected by the second zone of the sensor that is looking at the third region: this makes it possible to have a maximum amount of detail in the corresponding zone of the second image. The second region prevents inclined rays that are coming from the portion of the field that is covered by the third region of the filter from striking the zone of the second sensor that is looking at the first region, and thus prevents them from polluting viewing of the light spot in the corresponding zone of the second image. Thus, it is possible to obtain a second image enabling both the light spot and the details of the scene to be viewed. Nevertheless, this image does not make it possible to view those portions of the target that are in the immediate vicinity of the light spot. The details visible in the second image serve to enable the two images to be superposed by registering the two images accurately relative to each other so as to obtain a combined image in which the light spot (visible in the second image) is positioned on the first image together with all of its details, including those of the target.

The invention also provides a method of observing a scene and of designating a target present in the scene, the method comprising the following steps:
  projecting a laser beam in a predetermined range of wavelengths onto the target in order to form a light spot on the target;
  using a first image sensor to capture light flux coming from the scene in order to form a first image;

using a second image sensor to capture the light flux while filtering the light flux in order to form a second image of the scene, the filtering being performed by defining a first filter region containing the light spot, a second filter region surrounding the first region, and a third filter region surrounding the second region, the filtering being performed in the second region to block substantially all of the light flux coming from the scene, in the first region to attenuate the light flux outside the predetermined range of wavelengths, and in the third region to transmit a maximum amount of the light flux; and superposing the two images by using the zone of the second image that corresponds to the third region to register the second image spatially relative to the first image so as to form a single image.

Preferably, the laser beam has a predetermined theoretical wavelength and in the first region the filter has a passband of 10 nanometers (nm) centered on the predetermined theoretical wavelength.

Other characteristics and advantages of the invention appear on reading the following description of a particular and nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
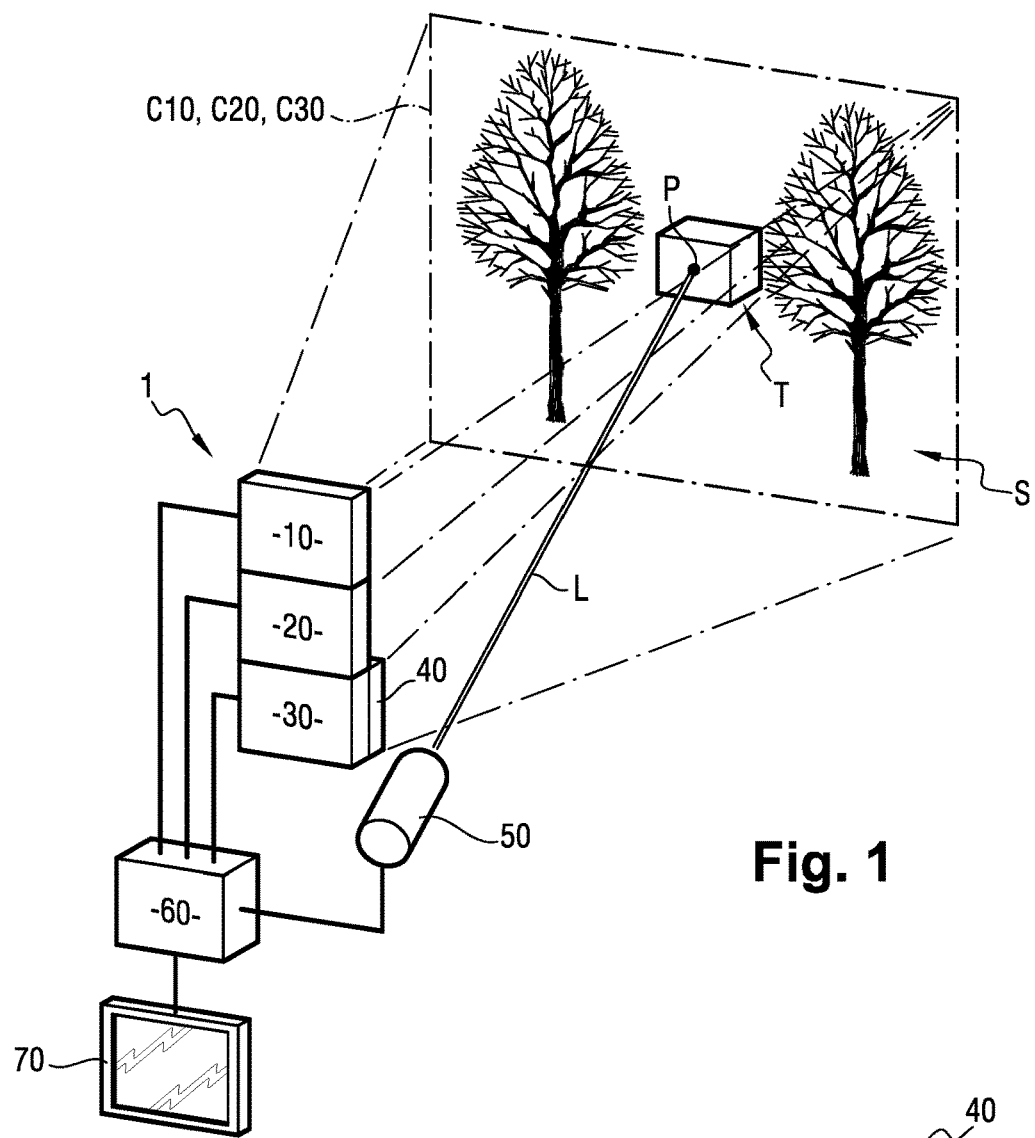
FIG. 1 is a diagrammatic perspective view of the apparatus of the invention.
Figure 2:
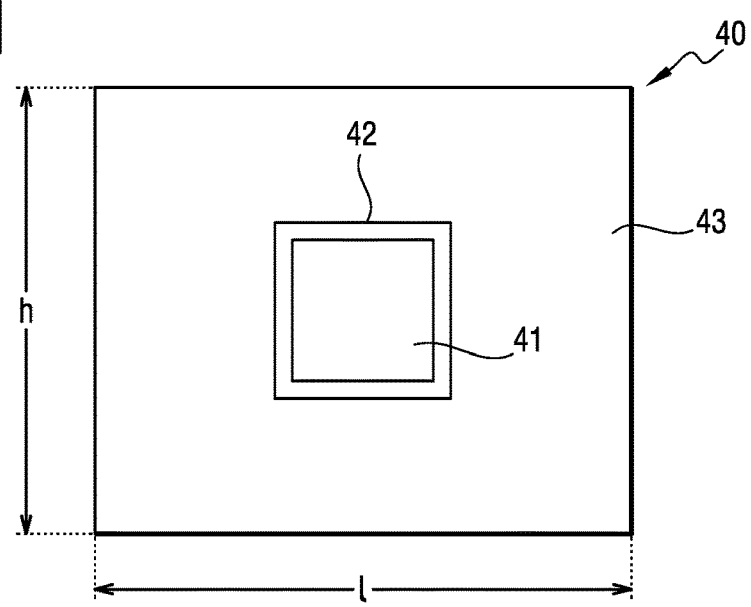
FIG. 2 is a diagrammatic face view of a filter used in the apparatus.

With reference to FIG. 1, the observation and designation apparatus of the invention is for viewing a scene S in which there is a target T on which there appears a light spot P formed by at least partial reflection of a laser beam L.

For this purpose, the observation and designation apparatus of the invention, given overall reference 1, comprises:

two first image sensors, namely a sensor 10 arranged for daytime observation of the scene S, and a sensor 20 arranged for nighttime observation of the scene S, the sensors 10 and 20 having respective identical fields C10 and C20;

a second image sensor, namely a sensor 30 that is arranged more particularly for observing the light spot P and that possesses a field C30;

a laser emitter 50 for emitting a laser beam L towards a predetermined zone of the field C30 of the sensor 30, specifically a central zone in this example; and an electronic image processor circuit 60 connected to a display 70 (e.g. a liquid crystal display (LCD) screen).

In this example, the sensor 10 is a CMOS sensor arranged to be sensitive to radiation at wavelengths in the visible range. The sensor 10 has definition of 1200 pixels by 1600 pixels at a pitch in the range 3 micrometers (μm) to 5 μm. The sensor 10 is arranged to supply electrical signals representative of images of the scene.

In this example, the sensor 20 is a CMOS sensor arranged to be sensitive to radiation at wavelengths in the infrared range. The sensor 20 has definition greater than 512 pixels by 640 pixels at a pitch in the range 15 μm to 20 μm. The sensor 20 is arranged to supply electrical signals representative of images of the scene.

In this example, the sensor 30 is a CMOS sensor arranged to be sensitive to radiation at wavelengths in the infrared range and in the visible range. The sensor has definition of 1024 pixels by 1280 pixels at a pitch of 5.3 μm. The sensor 30 is arranged to supply electrical signals representative of images of the scene. The sensors 10, 20, and 30 are mutually harmonized opto-mechanically so that the field C30 is superposed on the fields C10 and C20. In front of each of the sensors 10, 20, and 30, there is mounted a protective window and an optical unit for focusing light rays on said sensor (these elements are not shown in the figures). The sensors 10, 20, and 30 are themselves known, and each of them also includes a respective electronic interface circuit for interfacing with the electronic image processor circuit 60 and serving in particular to format the signals for transmission to the electronic image processor circuit 60.

The laser emitter 50 is arranged to emit laser pulses in a predetermined range of wavelengths. More precisely, the wavelength of the laser pulses is 1064 nm. The laser emitter 50 and the sensor 30 are mutually harmonized, preferably opto-mechanically.

The electronic image processor circuit 60 is a known computer unit comprising a processor, a memory, and an input/output module connected to the sensors 10, 20, and 30 and to the laser emitter 50 in order to:

synchronize the laser emitter 50 with the sensors 10, 20, and 30 (it should be observed that such synchronization is advantageous, but not essential);

process the signals coming from the sensors 10, 20, and 30 in order to form images suitable for display on the display 70;

select the sensor 10 or the sensor 20 as a function of the lighting conditions of the scene S; and execute a program having instructions arranged to perform the method of the invention.

An optical filter 40 is mounted in front of the sensor 30, between said sensor and the optical unit. In this example, the filter 40 is made on a glass plate having dimensions h and ,e corresponding to the dimensions of the sensor 30, and thickness of 3.5 millimeters (mm)±0.5 mm.

The filter 40 is more particularly a region-of-interest (ROI) filter having a first region 41 corresponding to the predetermined zone of the field towards which the laser beam L is emitted, a second region 42 surrounding the first region 41, and a third region 43 surrounding the second region 42. The filter 40 is arranged:

in the second region 42, to block substantially all of the light flux coming from the scene S;

in the first region 41, to attenuate the light flux outside a predetermined range of wavelengths; and in the third region 43, to transmit a maximum amount of the light flux.

More precisely, the filter 40 is arranged to provide:

in the first region 41, opacity to wavelengths lying in the range 0.3 μm to 1.2 μm with the exception of a 10 nm passband centered on the wavelength 1064 nm, so as to eliminate the background of the scene and conserve only the laser spot;

in the second region 42, opacity to wavelengths lying in the range 0.3 μm to 1.2 μm in order to block all light rays; and in the third region 43, no filtering of wavelengths lying in the range 0.4 μm to 1.1 μm in order to conserve a maximum amount of light flux over a broad spectrum together with details (dynamic range, gradient, contrast, inversion, . . . ).

In the first region 41, the filter 40 provides transmission of approximately 85% in the passband. The width of the passband of the first region is measured at half its maximum value (known as "full width at half maximum" (FWHM)). The passband is centered to within tolerance of ±2 nm, and its bandwidth is to within tolerance of ±2 nm.

The first region 41 of the filter 40 is in the shape of a square centered on the center of the sensor 30 and it corresponds to a first zone of the sensor 30 (a central zone) having definition of approximately 220 pixels by 220 pixels.

The second region 42 of the filter 40 extends facing a second zone of the sensor 30 and has the shape of a frame that is centered on the center of the sensor 30 and that has width equal to approximately 95 pixels. The inner frame has an inside dimension of 220 pixels so as to be an accurate fit around the first region 41. In order to calculate the width of the second region 42, the thickness of the filter that is taken into account is 4 mm (allowing for tolerances), which is the most favorable situation for passing inclined rays passing through the third region 43 so as to reach the zone of the sensor 30 that faces the first region 41 (this serves to eliminate the risk of spectral crosstalk between the first zone of the sensor and the third zone of the sensor 30).

The first region 41 covers a field having an angle of less than 1° and the second region 42 covers a field having an angle substantially equal to 2.9°.

The third region 42 thus extends facing a third zone of the sensor 30 going from the outside edges of the sensor 30 to the outer boundary of the second zone of the sensor 30.

The electronic processor circuit 60 is programmed to perform the observation and designation method of the invention. The method comprises the following steps:
  projecting laser beam pulses L onto the target T in order to form the light spot P on the target T;
  using one of the sensors 10 and 20 to capture light flux coming from the scene S in order to form a first image, referred to as the "support" image;
  using the sensor 30 to capture the light flux coming from the scene S while filtering the light flux in order to form a second image of the scene S, referred to as the "laser" image;
  superposing the two images, making use of the zone of the laser image that corresponds to the third region 43 of the filter 40 in order to register the laser image spatially relative to the support image; and
  merging the two images to form a single combined image. For viewing the combined image resulting from the merging, it is possible to conserve only the central zone.

The electronic processor circuit 60 synchronizes the image capture operations with the emission of laser pulses. It should be observed that the integration times of the sensor 30 and of the selected sensor 10 or 20 are determined in conventional manner as a function of ambient brightness conditions in the scene S. In the event of loss of synchronization, the integration time could be lengthened in order to be sure that the spot formed by at least one laser pulse is present (the integration time would then be longer than the laser pulse emission period).

Preferably, image capture is performed by using a "global shutter" mode of acquisition, however a "rolling shutter" mode of acquisition could equally well be used for static scenes.

Image superposition comprises the steps of:
  establishing a first image of the gradients of the support image and a second image of the gradients of the laser image;
  normalizing the two images of the gradients; and
  detecting the correlations between the two images of the gradients in order to establish registration parameters for registering the two images spatially relative to each other. The registration parameters are determined after an operation of weighting the correlations in order to give preference to correlations relating to a horizontal middle band in the images. Specifically, it is considered that these middle portions of the images are the most important since that is where the target T is to be found.

A look-up table with a homography matrix is thus determined in order to match the portion of the laser image that corresponds to the third region 43 with the corresponding portion of the support image. In order to be able to deform the laser image, it is preferable to select a sensor 30 having a field that is greater than the fields C10 and C20.

Image merging is itself known. In this example it is performed using the "overlay" technique.

In a variant, it would be possible to form merging of the "colormap" type. The combined image is then formed by defining, along one axis, gray levels representative of the brightness of the support image and, along the other axis, intensity levels of a color that depends on the color of the laser image.

Naturally, the invention is not limited to the embodiment described, but covers any variant coming within the ambit of the invention as defined by the claims.

In particular, the region-of-interest filter could have more than three zones, and the first zone need not be at the center of the filter.

The dimensions of the various regions of the filter could be different from those described. By way of example, the first region 41 could correspond to a zone of 172 pixels by 172 pixels.

The sensors could be of a type other than CMOS, e.g. CCD. The sensors could have definition other than 1024 by 1280 pixels and/or pitch other than 5.3 μm.

The apparatus could have only one sensor for supplying the support image: e.g. a sensor for daytime observation or a sensor for nighttime observation.

The invention claimed is:

1. An observation and designation apparatus comprising a first image sensor and a second image sensor that are connected to an electronic image processor circuit connected to a display, the first image sensor and the second image sensor being arranged to provide fields that are superposed in order to supply respectively at least a first image and a second image of a same scene, and the observation and designation apparatus further comprising a laser emitter for emitting a laser beam lying in a predetermined range of wavelengths into a predetermined zone of the fields of the second image sensor; a region-of-interest filter extending in front of the second image sensor, the region-of-interest filter having a first region corresponding to the predetermined zone of the field, a second region surrounding the first region, and a third region surrounding the second region, the region-of-interest filter being arranged, in the second region to block substantially all of a light flux coming from said same scene, in the first region to attenuate the light flux lying outside the predetermined range of wavelengths, and in the third region to transmit a maximum amount of the light flux; the electronic image processor circuit being arranged to superpose the first image and the second image by using a zone of the second image that corresponds to the third region of the region-of-interest filter in order to register the second image spatially relative to the first image.

2. The apparatus according to claim 1, wherein the laser beam has a predetermined theoretical wavelength and in the first region, the region-of-interest filter has a passband of 10 nm centered on the predetermined theoretical wavelength.

3. The apparatus according to claim 2, wherein in the first region, the region-of-interest filter provides transmission of 85% approximately in a passband of 85% approximately of 10 nm centered on the predetermined theoretical wavelength.

4. The apparatus according to claim 1, wherein the second image sensor has definition of 1024 by 1280 pixels.

5. The apparatus according to claim 4, wherein the first region of the region-of-interest filter corresponds to a zone of the second image sensor having definition of 220 by 220 pixels approximately.

6. The apparatus according to claim 4, wherein the second region of the region-of-interest filter is of width equal to 95 pixels approximately.

7. The apparatus according to claim 1, wherein the first region is positioned facing a central zone of the second image sensor.

8. The apparatus according to claim 1, having two first image sensors, one arranged for taking daytime images and the other arranged for taking nighttime images.

9. A method of observing a scene and designating a target present in the scene, the method comprising the following steps:
   projecting a laser beam in a predetermined range of wavelengths onto the target in order to form a light spot on the target;
   using a first image sensor to capture light flux coming from the scene in order to form a first image;
   using a second image sensor to capture the light flux while filtering the light flux in order to form a second image of the scene, the filtering being performed by defining a first filter region containing the light spot, a second filter region surrounding the first region, and a third filter region surrounding the second region, the filtering being performed in the second region to block substantially all of the light flux coming from the scene, in the first region to attenuate the light flux outside the predetermined range of wavelengths, and in the third region to transmit a maximum amount of the light flux; and
   superposing the first image and the second image by using a zone of the second image that corresponds to the third region to register the second image spatially relative to the first image so as to form a single image.

10. The method according to claim 9, wherein superposing the first image and the second image comprises the steps of:
    establishing a first image of gradients and a second image of gradients corresponding respectively to the first image and to the second image;
    normalizing the first image of gradients and the second image of gradients; and
    detecting correlations between the first image of gradients and the second image of gradients in order to establish registration parameters for spatially registering the first image and the second image relative to each other.

11. The method according to claim 10, including an operation of weighting the correlations in order to favor correlations concerning a horizontal middle band of the first image of gradients and the second image of gradients.

* * * * *